(12) United States Patent
Lad

(10) Patent No.: US 10,954,794 B2
(45) Date of Patent: \*Mar. 23, 2021

(54) ROTOR BLADE ARRANGEMENT

(71) Applicant: ROLLS-ROYCE plc, London (GB)

(72) Inventor: Bharat M. Lad, Nottingham (GB)

(73) Assignee: ROLLS-ROYCE plc, London (GB)

( \* ) Notice: Subject to any disclaimer, the term of this patent is extended or adjusted under 35 U.S.C. 154(b) by 0 days.

This patent is subject to a terminal disclaimer.

(21) Appl. No.: 16/409,111

(22) Filed: May 10, 2019

(65) Prior Publication Data

US 2019/0360340 A1 Nov. 28, 2019

(30) Foreign Application Priority Data

May 25, 2018 (GB) .................................. 1808646.2

(51) Int. Cl.
*F01D 5/02* (2006.01)
(52) U.S. Cl.
CPC .......... *F01D 5/027* (2013.01); *F05D 2220/32* (2013.01); *F05D 2230/60* (2013.01); *F05D 2260/15* (2013.01)

(58) Field of Classification Search
CPC ....... F04D 29/666; F04D 29/321; F01D 25/04
See application file for complete search history.

(56) References Cited

U.S. PATENT DOCUMENTS

| 1,502,903 | A | * | 7/1924 | Campbell | ............. | F01D 21/003 |
| | | | | | | 416/61 |
| 1,502,904 | A | * | 7/1924 | Campbell | ................. | F01D 5/22 |
| | | | | | | 416/61 |
| 4,097,192 | A | | 6/1978 | Kulina | | |
| 5,966,525 | A | * | 10/1999 | Manzi, Jr. | ................. | F01D 5/10 |
| | | | | | | 415/119 |
| 5,993,161 | A | * | 11/1999 | Shapiro | .................... | F01D 25/04 |
| | | | | | | 29/404 |
| 7,029,227 | B2 | * | 4/2006 | Berthillier | ................. | F01D 5/10 |
| | | | | | | 415/1 |
| 7,648,330 | B2 | * | 1/2010 | Schwaller | ............... | F02C 7/045 |
| | | | | | | 415/1 |
| 2002/0064458 | A1 | | 5/2002 | Montgomery et al. | | |
| 2015/0198047 | A1 | | 7/2015 | Roche | | |

(Continued)

FOREIGN PATENT DOCUMENTS

DE 102007045300 A1 4/2009
EP 1205633 5/2002

(Continued)

OTHER PUBLICATIONS

Great Britain search report dated Nov. 26, 2018, issued in GB Patent Application No. 1808646.2.

(Continued)

*Primary Examiner* — Woody A Lee, Jr.
(74) *Attorney, Agent, or Firm* — Shumaker & Sieffert, P.A.

(57) ABSTRACT

The blades for a rotor of a gas turbine engine are all manufactured to the same design. However, manufacturing tolerances mean that in practice each individual blade is different to the others. It is proposed to arrange the blades around the circumference of the rotor in a manner that limits excessive stress being induced in the blades due to differences in the vibration response between a given blade and its two neighbouring blades.

19 Claims, 8 Drawing Sheets

(56) References Cited

U.S. PATENT DOCUMENTS

2018/0347394 A1* 12/2018 Tanaka .................. F01D 5/26
2018/0372119 A1* 12/2018 Figaschewsky ...... F04D 29/666
2019/0360341 A1   11/2019 Lad
2019/0360342 A1* 11/2019 Lad ..................... F04D 29/321

FOREIGN PATENT DOCUMENTS

| EP | 1382858 | A1 | 1/2004 |
| EP | 1589191 | A1 | 10/2005 |
| EP | 1884624 | A2 | 6/2008 |
| GB | 2245661 | A  | 8/1992 |
| JP | H06248902 | | 9/1994 |
| WO | 2012035658 | A1 | 1/2014 |

OTHER PUBLICATIONS

Great Britain search report dated Nov. 9, 2018, issued in GB Patent Application No. 1808650.4.
Great Britain search report dated Nov. 9, 2018, issued in GB Patent Application No. 1808651.2.
Extended European Search Report from EP Application No. 19171073.0 dated Sep. 26, 2019, 8 pgs. (6714 CSM).
Response to Extended European Search Report from EP Application No. 19171073.0 dated Sep. 26, 2019, filed May 18, 2020, 71 pgs. (6714 CSM).
Extended European Search Report from EP Application No. 19171074.8 dated Oct. 7, 2019, 6 pgs. (6715 CSM).
Response to Extended European Search Report from EP Application No. 19171074.8 dated Oct. 7, 2019, filed May 18, 2020, 69 pgs. (6715 CSM).
Extended European Search Report from counterpart EP Application No. 19171072.2 dated Sep. 23, 2019, 7 pgs. (6713 CSM).
Response to Extended European Search Report from counterpart EP Application No. 19171072.2 dated Sep. 23, 2019, filed May 18, 2020, 68 pgs. (6713 CSM).
Response to Office Action from U.S. Appl. No. 16/409,114 dated Jun. 25, 2020, filed Sep. 25, 2020, 10 pgs.
Final Office Action from U.S. Appl. No. 16/409,114 dated Oct. 23, 2020, 5 pgs.
Office Action from U.S. Appl. No. 16/409,114, dated Jun. 25, 2020, 8 pp.
Final Office Action from U.S. Appl. No. 16/409,114, dated Oct. 23, 2020, 5 pp.
Office Action from U.S. Appl. No. 16/409,115, dated Jan. 7, 2021, 6 pp.
Notice of Allowance from U.S. Appl. No. 16/409,114, dated Dec. 23, 2020, 5 pp.
Response to Final Office Action dated Oct. 23, 2020, from U.S. Appl. No. 16/409,114, filed Dec. 17, 2020, 9 pp.

* cited by examiner

ROTOR BLADE ARRANGEMENT

CROSS-REFERENCE TO RELATED APPLICATIONS

This specification is based upon and claims the benefit of priority from United Kingdom patent application number GB 1808646.2 filed on May 25, 2018, the entire contents of which are incorporated herein by reference.

BACKGROUND

Technical Field

The present disclosure relates to the circumferential arrangement of rotor blades around a rotor. Aspects of the present disclosure relate to the circumferential arrangement of rotor blades around a rotor of a gas turbine engine.

Description of the Related Art

Gas turbine engines comprise a number of compressor stages and a number of turbine stages. Typically, each stage comprises a row of rotor blades (which may be referred to simply as a rotor) and a row of stator vanes. The row of rotor blades and the row of stator vanes may be axially offset from each other.

In use, the rotor stages rotate about an engine axis. Accordingly, the rotor must be sufficiently balanced in order to prevent undesirable out-of-balance effects, such as vibration, which may lead to increased wear and/or premature failure of components.

The rotor blades of the rotor may be manufactured separately to a rotor hub into which they are fixed in order to form the rotor. Although each rotor blade is designed, and intended, to have the same mass, manufacturing tolerances mean that there is typically small but measurable differences in the mass of the blades. Accordingly, in order to ensure that the rotor as a whole is sufficiently balanced, the blades are typically arranged in a specific pattern around the circumference of the rotor hub.

In this regard, FIG. 1 is a schematic of a gas turbine engine rotor 100 having a plurality of rotor blades 120 attached to a hub 110. The rotor blades 120 are circumferentially arranged around the hub 110, with equal circumferential spacing between each pair of neighbouring blades. The circumferential position of each rotor blade 120 around the hub 110 is labelled A-AJ, as shown in FIG. 1. FIG. 2 is a schematic graph showing the mass of each blade at each position A-AJ around the circumference of the rotor 100 in a conventional arrangement. The mass of the blades is normalized by the mass of the blade having the median mass in the blade set. As shown in the graph, the conventional pattern has a zig-zag pattern, with each blade that has a mass that is greater than the mass of the blade having the median mass having neighbouring blades that each has a mass that is less than the mass of the blade having the median mass. This conventional arrangement is such that radially opposing blades have similar masses. Thus, for example, if the blade at position A (which may be referred to as top dead centre) has the greatest mass (as shown in FIG. 2), then the blade at position S has the second greatest mass.

The conventional arrangement described above and shown in FIG. 2 has been developed in order to balance the rotor 100 as well as possible for a given set of blades.

SUMMARY

According to an aspect, there is provided a rotor for a gas turbine engine comprising a rotor hub and a plurality of rotor blades, each rotor blade being attached to the rotor hub at a rotor blade root. The rotor blades are arranged circumferentially around the rotor hub such that each rotor blade has two neighbouring rotor blades. Each rotor blade has a mass that is either greater than, less than, or equal to the median rotor blade mass of all of the rotor blades. For the majority of rotor blades that have a mass greater than the median, at least one of its two neighbouring rotor blades also has a mass greater than the median. For the majority of rotor blades that have a mass less than the median, at least one of its two neighbouring rotor blades also has a mass less than the median.

According to an aspect, there is provided a rotor for a gas turbine engine comprising a rotor hub and a plurality of rotor blades, each rotor blade being attached to the rotor hub at a rotor blade root, comprising:

a subset R of at least (for example exactly) p circumferentially neighbouring blades that all have a mass that is greater than the median rotor blade mass, where p is given by:

$$p = \max\{g \in Z | g \leq (n-1)/x\}$$

where:
Z is the set of integers;
n is the total number of rotor blades in the rotor; and
x is an even number less than $(n-1)/2$.

A majority of the blades that have a mass that is greater than the median rotor blade mass may be contained in a subset R.

According to an aspect, there is provided a rotor for a gas turbine engine comprising a rotor hub and a plurality of rotor blades, each rotor blade being attached to the rotor hub at a rotor blade root, comprising:

a subset S of at least (for example exactly) q circumferentially neighbouring blades that all have a mass that is less than the median rotor blade mass, where q is given by:

$$q = \max\{j \in Z | j \leq (n-1)/y\}$$

where:
Z is the set of integers;
n is the total number of rotor blades in the rotor; and
y is an even number less than $(n-1)/2$.

A majority of the blades that have a mass that is less than the median rotor blade mass may be contained in a subset S.

According to an aspect, there is provided a rotor for a gas turbine engine comprising a rotor hub and a plurality of rotor blades, each rotor blade being attached to the rotor hub at a rotor blade root, wherein:

the rotor blades form a rotor blade set comprising a total number of n rotor blades, the standard deviation of the mass of the rotor blades in the rotor blade set being given by $\sigma_{mass}$; and for the majority (for example all, n−1, n−2 or n−3) of the rotor blades, the difference between the mass of the rotor blade and the mass of at least one of its neighbouring rotor blades is less than the standard deviation of the mass of the rotor blades in the rotor blade set $\sigma_{mass}$.

According to an aspect, there is provided a method of assembling a rotor for a gas turbine engine, the rotor comprising a rotor hub and a plurality of rotor blades, each rotor blade having a mass that is either greater than, less than, or equal to the median rotor blade mass of all of the rotor blades, the method comprising:

attaching each rotor blade to the rotor hub using a rotor blade root so as to arrange the rotor blades circumferentially around the rotor hub such that each rotor blade has two neighbouring rotor blades, wherein:

the method further comprises arranging the rotor blades such that:

for the majority of rotor blades that have a mass greater than the median, at least one of the neighbouring rotor blades also has a mass greater than the median; and for the majority of rotor blades that have a mass less than the median, at least one of the neighbouring rotor blades also has a mass less than the median.

The step of arranging the rotor blades in the manner described and/or claimed may involve deliberately (or actively) selecting the blades to form the described and/or claimed pattern.

It will be appreciated that different aspects of the present disclosure may apply alone or in combination.

The present disclosure recognises that whilst the conventional arrangement of rotor blades shown in FIG. 2 may provide adequate dynamic rotor balancing, it may result in other detrimental effects. In particular, the mass m of a blade is related to the natural frequency f of that blade through the equation:

$$f = \sqrt{\frac{k}{m}}$$

Where:
f=natural frequency of the blade for a particular mode
m=mass of the blade
k=stiffness of the blade for a particular mode Accordingly, there is a correlation between the mass of a blade and its natural frequency. The present disclosure recognizes that the conventional FIG. 2 arrangement results in some blades having appreciably different natural frequencies to their two neighbouring blades. For example, in general the natural frequency of the blade at position C may be significantly lower than the natural frequency of the blades at positions B and D (notwithstanding any difference in the stiffness k of the three blades). Accordingly, at a given excitation frequency (which may be a multiple of the engine rotational speed), the system response of the rotor disc and blades does not occur at a singular turned frequency; one blade (for example the blade at position C) may experience a lower vibration response amplitudes than a tuned system whereas its two neighbouring blades (for example at positions B and D) may both experience much greater vibration response amplitudes. This may be because the excitation frequency is substantially matched to the natural frequency of the neighbouring blades (for example at positions B and D), but not so well matched to the natural frequency of the blade in between (for example at position C).

The present disclosure recognises that this difference in vibration response between one blade (such as blade C in the FIG. 2 example) and its two neighbouring blades (such as blades B and D in the FIG. 2 example) can result in high levels of stress in certain regions of the rotor 100. For example, the differential vibration amplitudes may induce particularly high stress around the blade root (i.e. the part of the blade 120 used to attach it to the hub 110) of the central blade (for example blade C in the FIG. 2 example). The present disclosure recognises that any blade which has a natural frequency for a particular mode that is appreciably different to that of both neighbouring blades may be particularly susceptible to increased stress (for example around the root) during operation, and that the conventional balancing arrangement shown in FIG. 2 is likely to result in at least some blades experiencing this undesirable effect.

The rotors and methods described and/or claimed herein at least in part address the increased stress resulting from the conventional balancing arrangement. For example, the described and/or claimed blade arrangements may significantly reduce the likelihood of a blade (which may be referred to as an intermediate blade) having a natural frequency that is significantly mis-matched to the natural frequency of both neighbouring blades. This may mean that the two blades either side of an intermediate blade do not exhibit a response that is similar to each other—and different to the intermediate blade—to a given excitation frequency, and so do not induce large stresses in the intermediate blade, for example through large and at least partially synchronized vibration amplitudes relative to the intermediate blade.

Rotors described and/or claimed herein may be for use in any part of a gas turbine engine, such as the fan, compressor or turbine.

Optionally, for all rotor blades that do not define or exhibit the median rotor blade mass (and further optionally for the rotor blade(s) that define or exhibit the median rotor blade mass in some arrangements), rotor blades that have a mass greater than the median have at least one neighbouring rotor blade that also has a mass greater than the median. Optionally, for all rotor blades that do not define or exhibit the median rotor blade mass (and further optionally for the rotor blade(s) that define or exhibit the median rotor blade mass in some arrangements), rotor blades that have a mass less than the median have at least one neighbouring rotor blade that also has a mass less than the median.

Where the number of rotor blades n is odd, the median rotor blade mass is defined by the rotor blade having the median mass, which is the rotor blade that is the (n+1)/2 heaviest, i.e. the blade that has an equal number ((n−1)/2) of heavier blades and lighter blades.

Where the number of rotor blades n is even, the median rotor blade mass is defined as the mean mass of the n/2 and (n+2)/2 heaviest blades (so, for example, if there are 36 blades, the median rotor blade mass is the mean mass of the $18^{th}$ and $19^{th}$ heaviest blades).

The rotor blades may form a rotor blade set comprising a total number of n rotor blades.

The standard deviation of the mass of the rotor blades in the rotor blade set may be given by $\sigma_{mass}$. For the majority of the rotor blades, the difference between the mass of the rotor blade and the mass of at least one of its neighbouring rotor blades may be less than the standard deviation of the mass of the rotor blades in the rotor blade set $\sigma_{mass}$. For example, the difference between the mass of the rotor blade and the mass of at least one of its neighbouring rotor blades may be less than the standard deviation of the mass of the rotor blades in the rotor blade set $\sigma_{mass}$ for at least n−5, n−4, n−3, n−2, n−1 or all rotor blades in the set of n rotor blades.

Each rotor blade may have a position in a list of the rotor blades ordered by ascending mass. A majority (for example more than half, n−5, n−4, n−3, n−2, n−1 or all) of the n rotor blades may have a position in the list of rotor blades ordered by mass that is within five places, for example four, three or two places of the position in that list of at least one neighbouring rotor blade.

At least two neighbouring blades (i.e. adjacent blades) may have a mean mass that is closer to the mass of the heaviest blade than to the median blade mass.

At least two neighbouring blades (i.e. adjacent blades) may have a mean mass that is closer to the mass of the lightest blade than to the median blade mass.

As noted elsewhere, the rotor may comprise a subset R of at least (for example exactly) p circumferentially neighbouring blades that all have a mass that is greater than the mass of the median blade, where p is given by:

$$p = \max\{m \in Z | m \leq (n-1)/x\}$$

where:
Z is the set of integers;
n is the total number of rotor blades in the rotor; and
x is an even number less than (n−1)/2.

The value of p (i.e. the number of blades in the subset R) may be, for example, any integer between 2 and n/2.

Purely by way of example, the value of x may be 2, 4, 6, 8, 10, n/2 (where n is even) or (n−1)/2 (where n is odd).

The rotor may comprise at least two such subsets R of circumferentially neighbouring blades that all have a mass that is greater than the mass of the median blade. Each subset R may be circumferentially separated by at least one blade having a mass that is less than the mass of the median blade. The number of subsets R may be equal to x/2.

Within the subset R of circumferentially neighbouring blades, the mass of each blade may be less than the mass of the neighbouring blade that is circumferentially closer to the blade within the subset R that has the maximum mass.

The blade having the greatest mass of the p blades within the subset R may be positioned circumferentially centrally. This may mean that that the difference between the number of blades in the subset R that are on the anticlockwise side of the blade with the maximum mass and the number of blades in the subset R that are on the clockwise side of the blade with the maximum mass is either 0 or 1. Where p is odd, there may be (p−1)/2 blades in the subset R either side of the blade in the subset R having the greatest mass. Where p is even, there may be (p−2)/2 blades on one side and p/2 blades on the other side of the blade in the subset with the greatest mass. The mass of the blades in the subset R may be said to sequentially decrease moving circumferentially away from the blade in the subset R having the greatest mass.

For arrangements having more than one subset R, the difference in the number of blades in any two subsets may be one or less, i.e. may be 0 or 1.

As noted elsewhere, the rotor may comprise a subset S of at least (for example exactly) q circumferentially neighbouring blades that all have a mass that is less than the mass of the median blade, where q is given by:

$$q = \max\{j \in Z | j \leq (n-1)/y\}$$

where:
Z is the set of integers;
n is the total number of rotor blades in the rotor; and
y is an even number less than (n−1)/2.

The value of q (i.e. the number of blades in the subset S) may be, for example, any integer between 2 and n/2.

Purely by way of example, the value of y may be 2, 4, 6, 8, 10, n/2 (where n is even) or (n−1)/2 (where n is odd).

The rotor according may comprise at least two such subsets S of circumferentially neighbouring blades that all have a mass that is less than the mass of the median blade. Each subset S may be circumferentially separated by at least one blade having a mass that is greater than the mass of the median blade. The number of subsets S may be equal to y/2.

Within the subset S of circumferentially neighbouring blades, the mass of each blade may be greater than the mass of the neighbouring blade that is circumferentially closer to the blade within the subset S that has the maximum mass.

The blade having the lowest mass of the q blades within the subset S may be positioned circumferentially centrally. This may mean that that the difference between the number of blades in the subset S that are on the anticlockwise side of the blade with the minimum mass and the number of blades in the subset S that are on the clockwise side of the blade with the minimum mass is either 0 or 1. Where q is odd, there may be (q−1)/2 blades in the subset S either side of the blade in the subset S having the lowest mass. Where q is even, there may be (q−2)/2 blades on one side and q/2 blades on the other side of the blade in the subset with the lowest mass. The mass of the blades in the subset S may be said to sequentially decrease moving circumferentially away from the blade in the subset S having the lowest mass.

For arrangements having more than one subset S, the difference in the number of blades in any two subsets may be one or less, i.e. may be 0 or 1.

The rotor may comprise both one or more subsets R of circumferentially neighbouring blades that all have a mass that is greater than the mass of the median blade and one or more subsets S of circumferentially neighbouring blades that all have a mass that is less than the mass of the median blade. The number of subsets R may be equal to the number of subsets S. The difference between the number of subsets R and the number of subsets S may be less than or equal to 1. The subsets R and S may be circumferentially alternating around the circumference of the rotor. A subset R may be positioned next to a subset S and/or between two subsets S. A subset S may be positioned next to a subset R and/or between two subsets R.

If the rotor has a total of n rotor blades, then if the rotor blades are arranged in decreasing mass order from 1 to n, with 1 being the heaviest rotor blade and n being the lightest rotor blade, then rotor blade 1 (the heaviest blade) and any one (or more) of rotor blades 2, 3 and 4 may be neighbouring rotor blades. For example, rotor blades 1 and 2 may be neighbouring rotor blades. By way of further example, rotor blades 1 and 3 may be neighbouring rotor blades. By way of further example, rotor blades 1 and 4 may be neighbouring rotor blades.

Additionally or alternatively, rotor blade 2 (the second heaviest blade) and any one (or more) of rotor blades 3, 4 and 5 may be neighbouring rotor blades. Of course, a single rotor blade cannot be used twice. Rotor blade 2 may be substantially circumferentially opposite to rotor blade 1. Substantially circumferentially opposite may mean, for example, one of the closest two blades to the position on the rotor that is directly circumferentially opposite.

It will be appreciated that a number of different precise blade arrangements are in accordance with, and enjoy the advantages associated with, the present disclosure. However, purely by way of example, if the rotor blades are arranged in mass order from 1 to n, with 1 being the heaviest rotor blade and n being the lightest rotor blade, then the rotor may comprise a circumferential sequence of rotor blades in the order 1, 3, n, n−2. Purely by way of further example, the rotor may comprise a circumferential sequence of rotor blades in the order 2, 4, n−1, n−3.

Where required, the rotor may further comprise one or more balancing masses. Such balancing masses may ensure that the rotor is sufficiently balanced. Such balancing masses would typically be very light, for example relative to the mass of a blade. Such balancing masses may be placed in any suitable location, for example on the rotor hub. In some arrangements, balancing masses may not be required.

Where balancing masses are required, the method of assembling the rotor stage may comprise balancing the rotor, for example by determining where (for example the circumferential location) to add mass and how much to add, and then adding the determined mass in the determined location.

According to an aspect, there is provided a gas turbine engine comprising one or more rotors as described and/or claimed herein. Such rotors may be provided anywhere in the engine, for example in a fan, compressor or in a turbine.

The rotors described and/or claimed herein may be particularly, but not exclusively, effective where forcing vibration is at or around the natural frequency of a particular vibration mode of the rotor blades for that rotor. Such forcing may be, for example mechanical and/or aerodynamic forcing. Purely by way of example, the forcing may be due to the engine rotation and/or may be at a frequency that is related to the engine rotational speed, such as at the engine speed itself (so called first engine order, or 1 EO), double the engine speed (2 EO) or any multiple of engine speed (for example up to 5 EO, 10 EO, 15 EO 20 EO or even greater than 20 EO).

It will be appreciated that where the term "at least one neighbouring rotor blade" (or similar) is used anywhere herein, this may be taken to mean "one or both of the neighbouring rotor blades. Also as used herein, "neighbouring" may mean "circumferentially adjacent". Thus, for example, the term "neighbouring rotor blade" may be substituted with the term "circumferentially adjacent rotor blade".

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may relate to any type of gas turbine engine that comprises one or more rotors. Purely by way of example the gas turbine engine may (or may not) comprise a fan that is driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox (where present) may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades (at some of which may be arranged as described and/or claimed herein) and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades (at some of which may be arranged as described and/or claimed herein) and a row of stator vanes. The row of rotor blades and the row of stator vanes may be axially offset from each other.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 3:
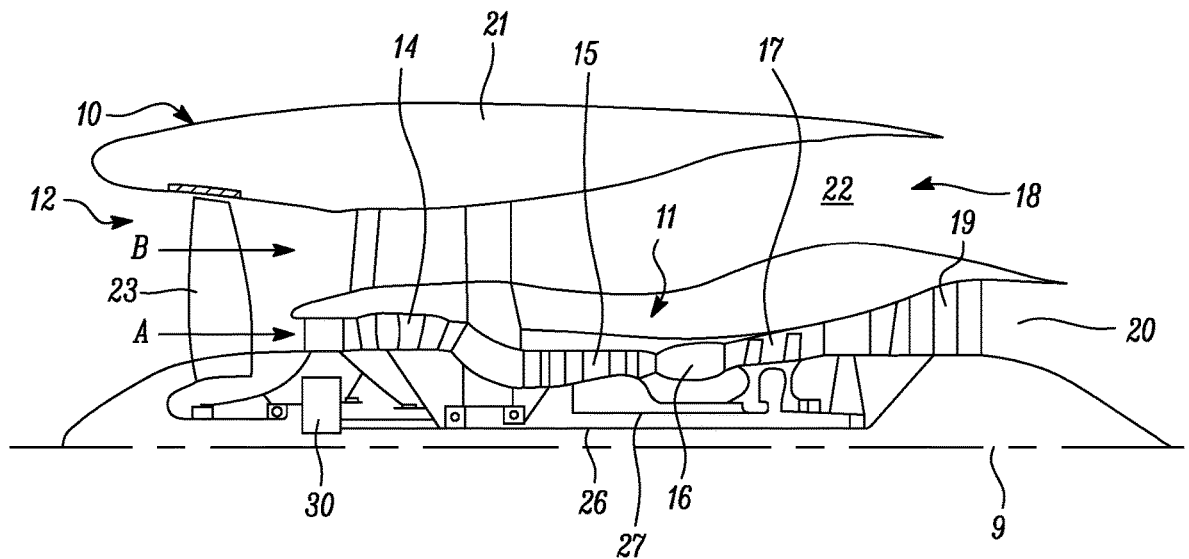
FIG. 3 is a sectional side view of a gas turbine engine.

FIG. 3 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 4:
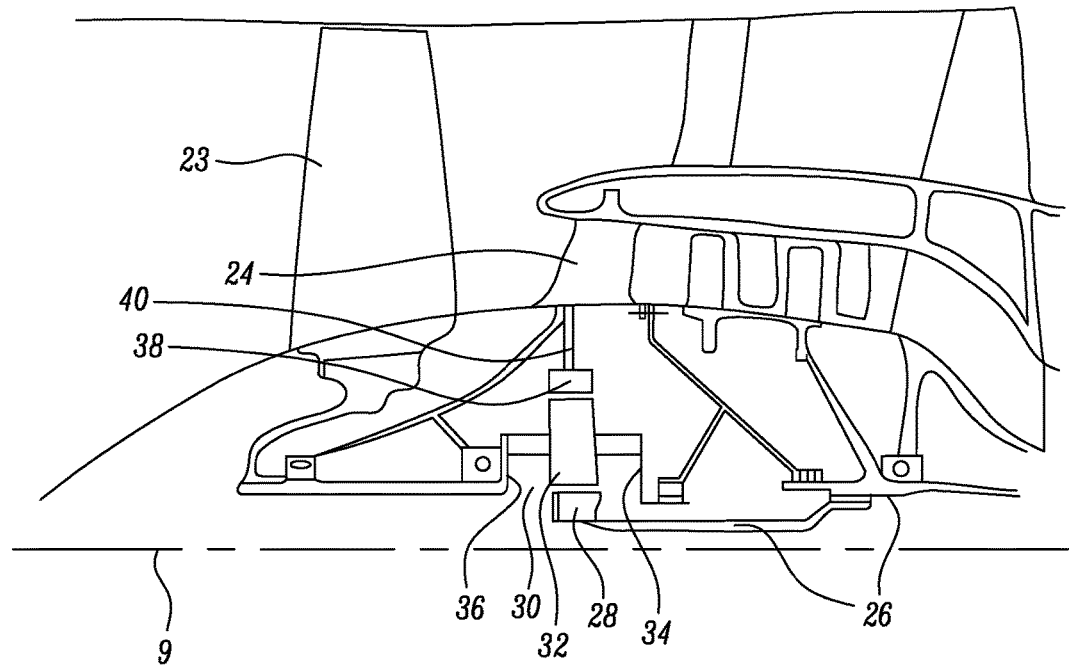
FIG. 4 is a close up sectional side view of an upstream portion of a gas turbine engine.

An exemplary arrangement for a geared fan gas turbine engine 10 is shown in FIG. 4. The low pressure turbine 19 (see FIG. 3) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 5:
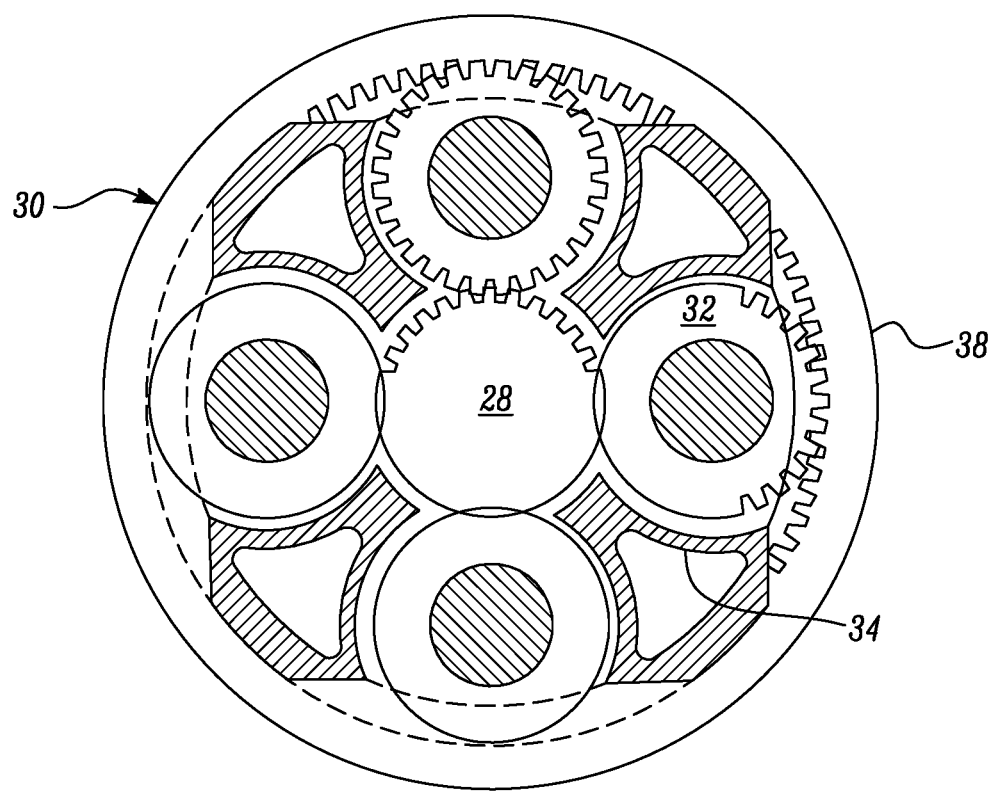
FIG. 5 is a partially cut-away view of a gearbox for a gas turbine engine.

The epicyclic gearbox 30 is shown by way of example in greater detail in FIG. 5. Each of the sun gear 28, planet gears 32 and ring gear 38 comprise teeth about their periphery to intermesh with the other gears. However, for clarity only exemplary portions of the teeth are illustrated in FIG. 5. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 4 and 5 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 4 and 5 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 4 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 4. For example, where the gearbox 30 has a star arrangement (described above), the skilled person would readily understand that the arrangement of output and support linkages and bearing locations would typically be different to that shown by way of example in FIG. 4.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 3 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 3), and a circumferential direction (perpendicular to the page in the FIG. 3 view). The axial, radial and circumferential directions are mutually perpendicular.

Figure 1:
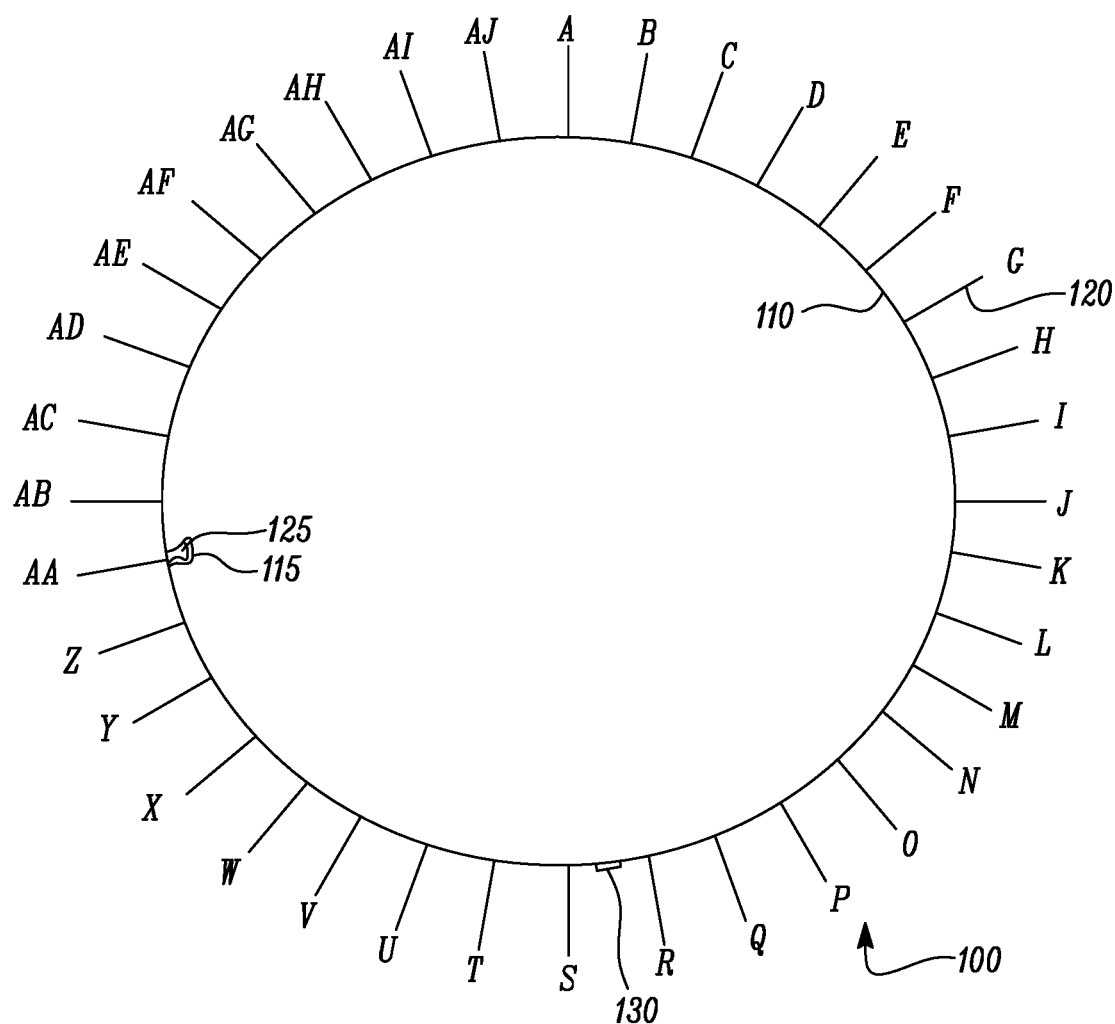
FIG. 1 is a schematic of a rotor of a gas turbine engine.

FIG. 1 is a schematic showing a rotor 100 of the gas turbine engine 10. The rotor 100 may be a rotor in the engine 10, for example any rotor in the compressor sections 14, 15 or any rotor in the turbine sections 17, 19. The rotor 100 is arranged to rotate around the rotational axis 9 of the gas turbine engine 10.

The rotor 100 comprises a rotor hub 110 and rotor blades 120. The rotor 100 shown by way of example in FIG. 1 comprises 36 rotor blades 120, but it will be appreciated that a rotor in accordance with the present disclosure may comprise any number (odd or even) of rotor blades 120.

The rotor blades 120 are evenly spaced around the circumference of the hub. Accordingly, the angle between each and every pair of neighbouring blades 120 is the same as the angle between each and every other pair of neighbouring blades 120. The blades 120 may be provided to the hub 110 in any suitable manner. In the FIG. 1 example, each blade 120 comprises a blade root 125 that engages with a corresponding slot 115 in the hub 110. It will be appreciated that for clarity the blade root 125 and the slot 115 have only been shown at one blade location (AA) in FIG. 1, but all of the blades 120 are attached to the hub 110 in the same manner. Purely by way of example, the root 125 may be of a fir-tree design or a dovetail design.

The circumferential positions at which each of the blades 120 is provided to the hub 110 (which correspond to the positions of the slots 115 in the FIG. 1 example) are labelled A-AJ in FIG. 1. Thus, it will be appreciated that each of the letters A-AJ represents the circumferential position on the rotor 100, rather than an individual blade. Accordingly, if the position of two blades were swapped, the labels would remain unmoved. As such, a blade at the circumferential position labelled with a particular letter (say, 'E') may be moved to a different circumferential position (say, 'AB') without changing the circumferential labels shown in FIG. 1.

Each rotor blade 120 may be manufactured separately from the hub 110 and from the other rotor blades 120 using any suitable process, which may comprise, for example, casting and/or machining. Each rotor blade 120 is intended to have the same mass as the other rotor blades 120. However, due to manufacturing tolerances, the actual mass of each blade 120 is not the same as all of the other blades.

Indeed, typically, the mass of each blade 120 is different to the mass of each of the other blades 120.

Accordingly, a given set of n blades 120 has a median mass. Where the number n of blades 120 is odd, the median mass is the mass of the blade that has an equal number of heavier and lighter blades in the set. Where the number n of blades 120 is odd, the median mass is the mean mass of the blade that has n/2 heavier blades and the blade that has (n−1)/2 heavier blades in the blade set. By way of example, the FIG. 1 rotor has 36 blades, such that the median mass is calculated as the mean of the $18^{th}$ and $19^{th}$ heaviest blades in the blade set.

Once the median mass has been calculated, the mass of every blade 120 in the blade set can be normalized by the median mass.

FIGS. 6 to 9 show different arrangements of the rotor blades 120 around the circumference of the rotor 100 in accordance with examples of the present disclosure. Specifically, the x-axis in FIGS. 6 to 9 shows the circumferential position A-AJ with reference to the FIG. 1 schematic, and the y-axis shows the mass of the blade at each of the circumferential positions A-AJ, normalized (i.e. divided by) the median mass of the blade set.

It will be appreciated that the specific (and normalised) masses of the blades 120 in the blade set used for the examples of FIGS. 6 to 9 are by way of example only, and the actual absolute or normalised mass of the blades 120 in the blade set may have any distribution. Purely by way of example, the mass of the heaviest blade 120 in the blade set (shown at position A in FIG. 6) is around 5.5% greater than the median mass, and the mass of the lightest blade 120 in the blade set (shown at position C in FIG. 6) is just under 5% less than the median mass.

A set of n blades may be arranged in order of descending mass, such that blade 1 is the heaviest blade and blade n is the lightest blade. Accordingly, the blades may be numbered 1 to n (i.e. 1, 2, 3 (n−2), (n−1), n), where the lighter the blade, the higher the number.

In each of FIGS. 6 to 9, the blades 120 are arranged in the positions A-AJ such that for the majority of rotor blades that have a mass greater than the median (i.e. blades having a normalized mass greater than 1), at least one of the neighbouring rotor blades also has a mass greater than the median. Similarly, for the majority of rotor blades that have a mass less than the median (i.e. blades having a normalized mass less than 1), at least one of the neighbouring rotor blades also has a mass less than the median.

Figure 2:
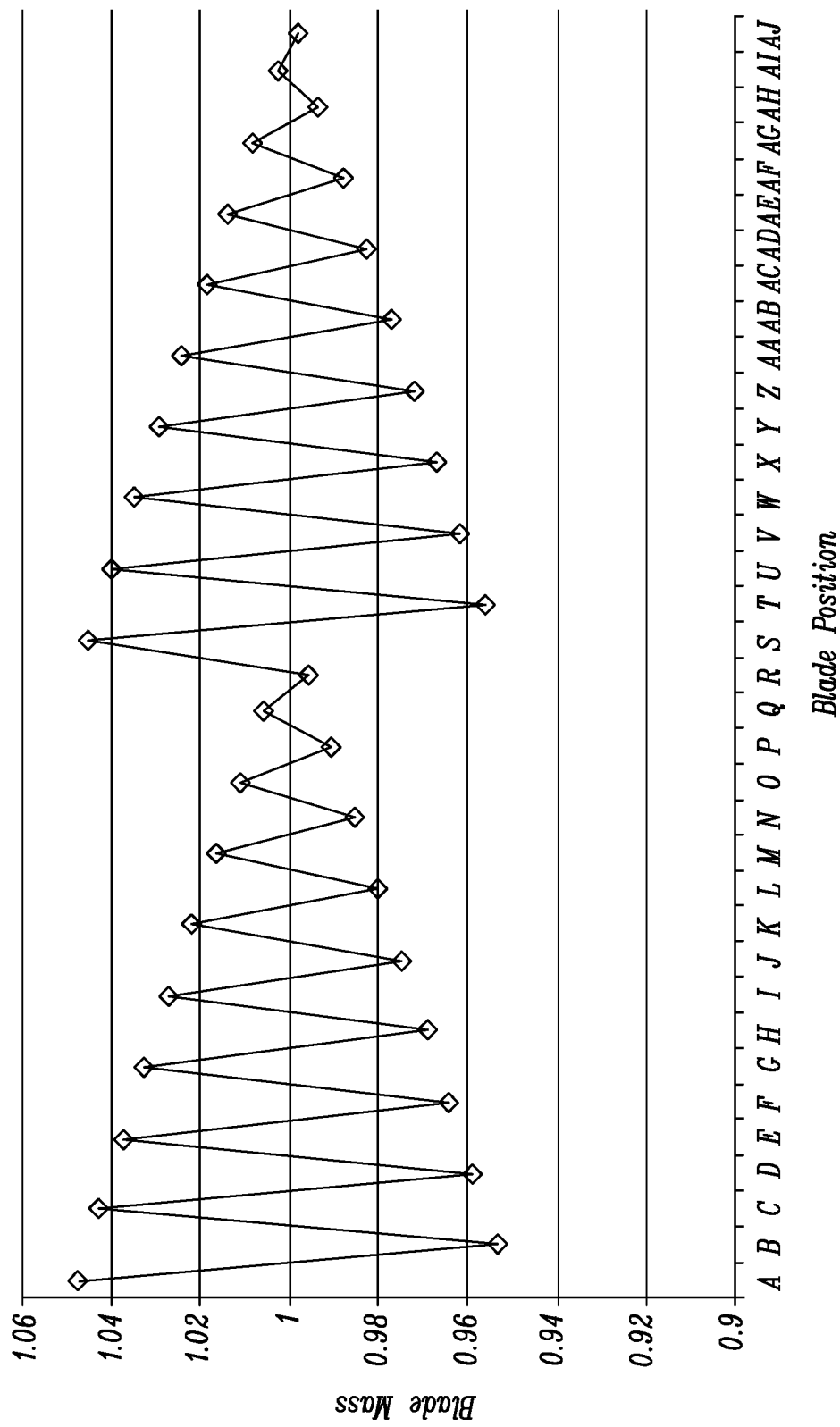
FIG. 2 is a graph showing the mass and position of rotor blades around the circumference of a rotor in a conventional arrangement.
Figure 6:
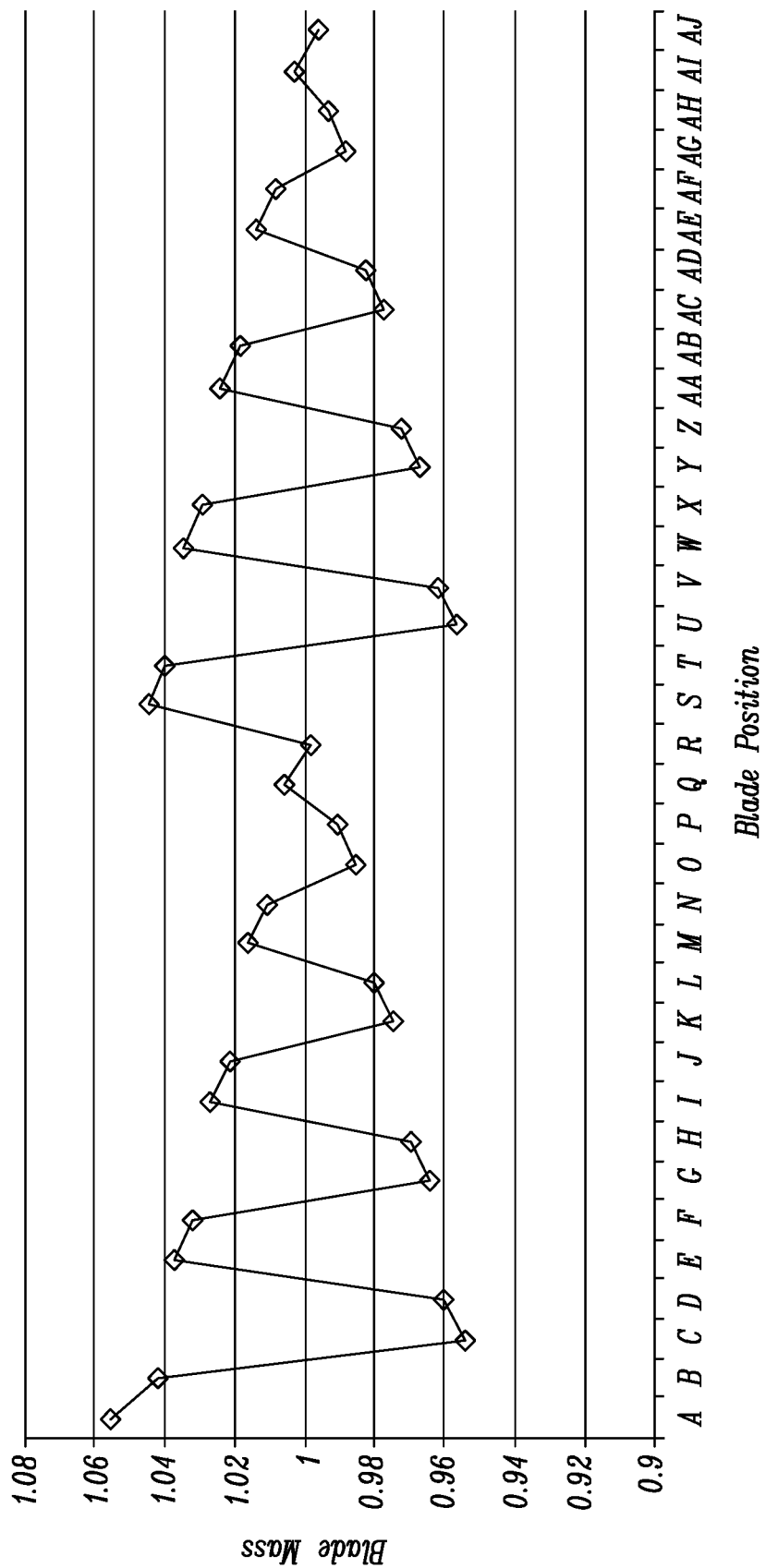
FIG. 6 is a graph showing the mass and position of rotor blades around the circumference of a rotor in accordance with an example of the present disclosure.

In the FIG. 6 arrangement, only the blades at positions Q and AI have a mass greater than the median mass but do not have at least one neighbouring rotor blade that has a mass greater than the median. However, because the blades at positions Q and AI and their neighbouring blades are all close to the median mass, they will not suffer from the significant increase in stress that may be induced in a blade that has a significantly different mass to both of its neighbouring blades (such as the blade C in the conventional arrangement of FIG. 2). In the FIG. 7 arrangement, only the blade Q has a mass greater than the median mass but does not have at least one neighbouring rotor blade that has a mass greater than the median, but again because the blade at position Q and its neighbouring blades are all close to the median mass, they will not suffer from the significant increase in stress.

Figure 8:
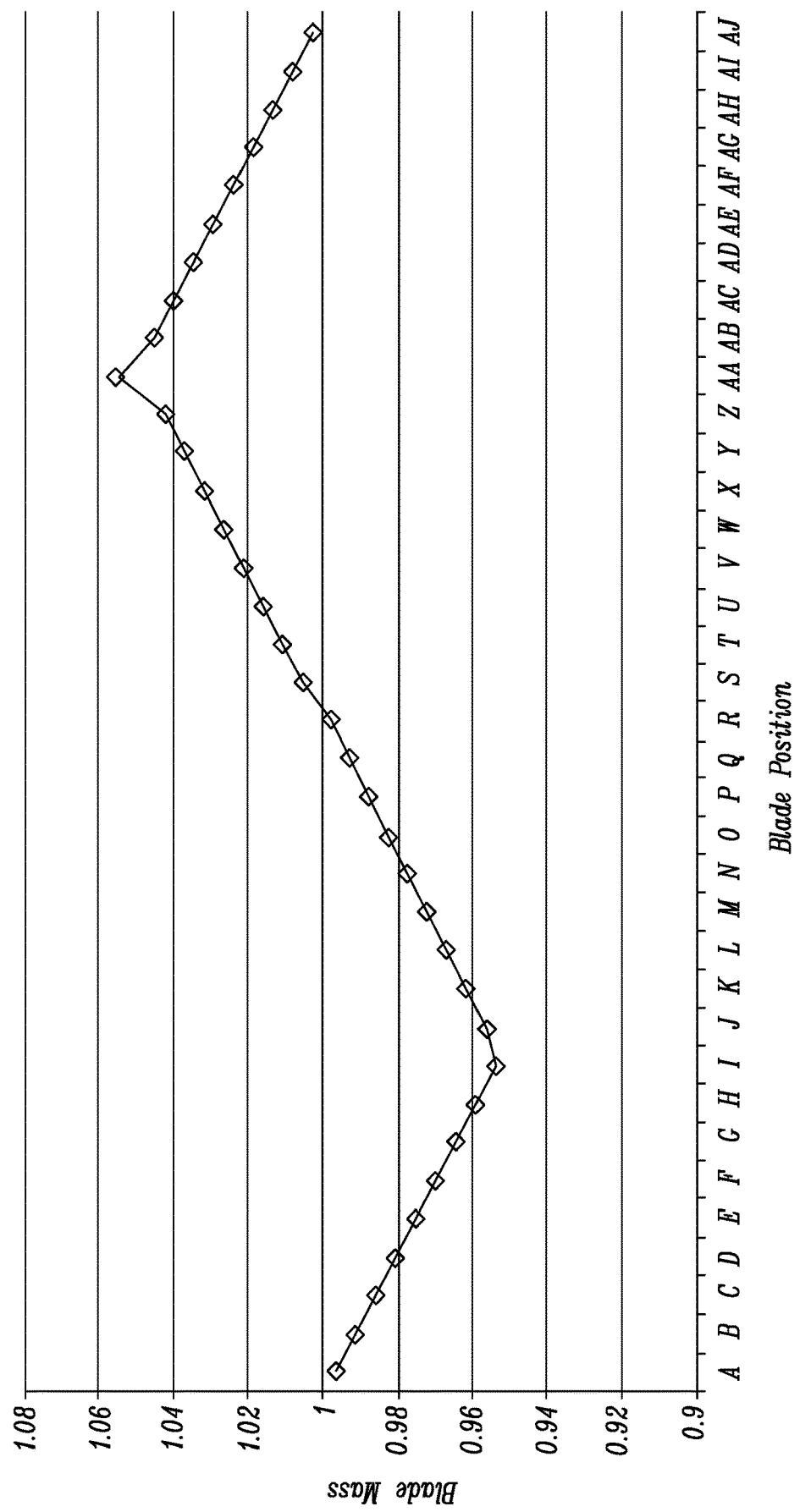
FIG. 8 is a graph showing the mass and position of rotor blades around the circumference of a rotor in accordance with an example of the present disclosure.
Figure 9:
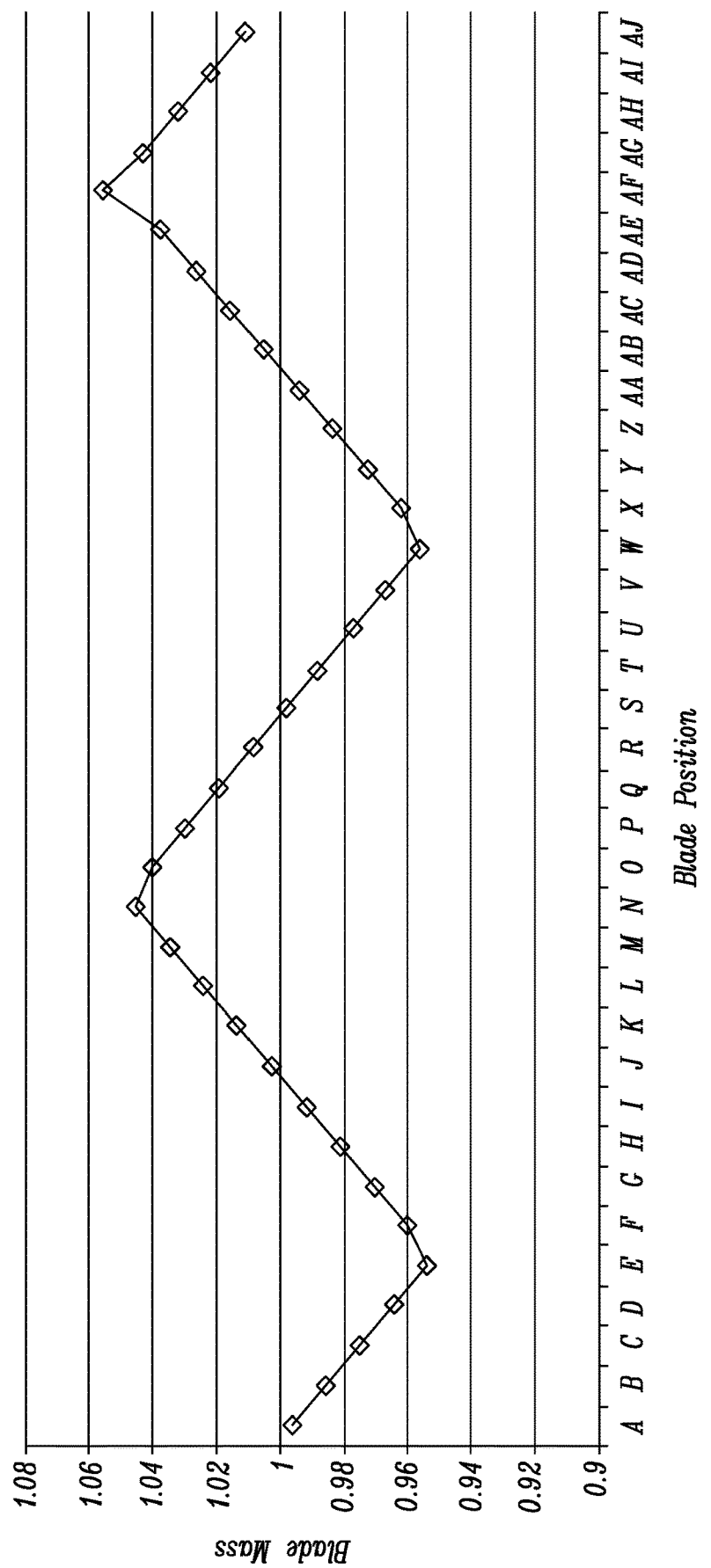
FIG. 9 is a graph showing the mass and position of rotor blades around the circumference of a rotor in accordance with an example of the present disclosure.

FIGS. 8 and 9 show examples of arrangements in which for all of rotor blades that have a mass greater than the median, at least one of the neighbouring rotor blades also has a mass greater than the median. Similarly, FIGS. 8 and 9 are examples of arrangements in which for all of rotor blades that have a mass less than the median, at least one of the neighbouring rotor blades also has a mass less than the median.

The mass of the rotor blades in the set of rotor blades 120 has a standard deviation $\sigma_{mass}$ calculated in the conventional manner. Purely by way of example, the standard deviation of the mass of the rotor blades 120 in the rotor blade set (of 36 rotor blades) is 0.028 (i.e. 2.8%). The arrangements of FIGS. 6 to 9 are all examples of arrangements in which the difference between the mass of any given rotor blade in the rotor blade set and the mass of at least one of its neighbouring rotor blades is less than the standard deviation of the mass of the rotor blades in the rotor blade set $\sigma_{mass}$.

FIGS. 6 to 9 are all examples of arrangements that contain a subset R of at least p circumferentially neighbouring blades that all have a mass that is greater than the median blade mass, where p is given by:

$$p=\max\{g \in Z | g \leq (n-1)/x\}$$

where:

Z is the set of integers;

n is the total number of rotor blades in the rotor; and x is an even number less than (n−1)/2.

Figure 7:
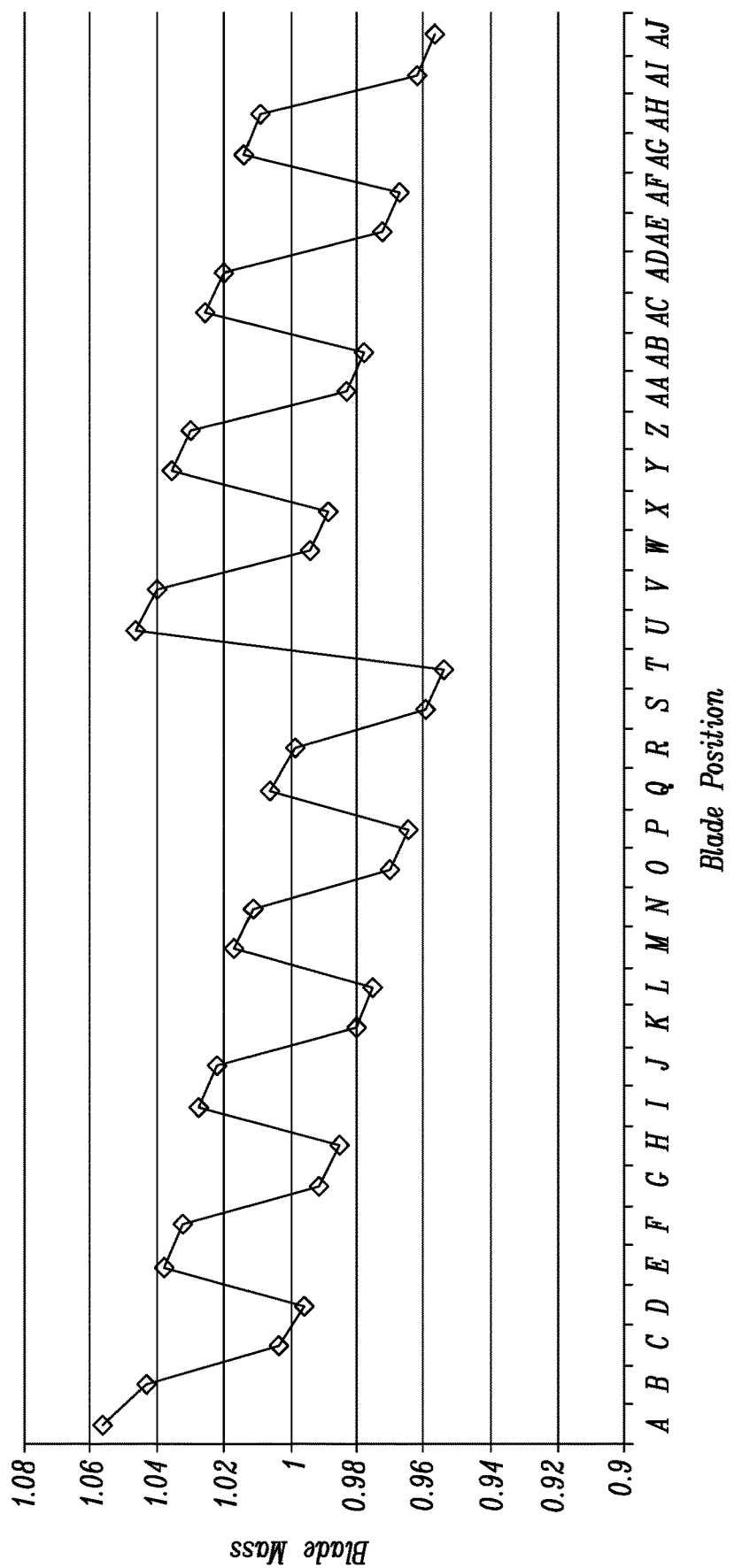
FIG. 7 is a graph showing the mass and position of rotor blades around the circumference of a rotor in accordance with an example of the present disclosure.

The arrangements of FIGS. 6 and 7 each contain 8 such subsets R, each containing 2 blades (p=2) with the value of x being 16 (i.e. the highest even number less than (n−1)/2, with n=36).

The arrangement of FIG. 8 contains 1 such subset R containing 18 blades (p=17), with the value of x being 2.

The arrangement of FIG. 9 contains 2 such subsets R each containing 9 blades (p=8), with the value of x being 4.

FIGS. 6 to 9 are all examples of arrangements that contain a subset S of at least q circumferentially neighbouring blades that all have a mass that is less than the median blade mass, where q is given by:

$$q=\max\{j \in Z | j \leq (n-1)/y\}$$

where:

Z is the set of integers;

n is the total number of rotor blades in the rotor; and y is an even number less than (n−1)/2.

The arrangements of FIGS. 6 and 7 each contain 8 such subsets S, each containing 2 blades (q=2) with the value of y being 16 (i.e. the highest even number less than (n−1)/2, with n=36).

The arrangement of FIG. 8 contains 1 such subset S containing 18 blades (q=17), with the value of y being 2.

The arrangement of FIG. 9 contains 2 such subsets S each containing 9 blades (q=8), with the value of y being 4.

Purely for completeness, and by way of non-limitative example, the table below shows the order of the rotor blades 120 provided around the circumference of the rotor 100 for each of the arrangements shown in FIGS. 6 to 9. The circumferential positions A-AJ relate to the schematic shown in FIG. 1. The blade number is the position of the blade in a list ordered by blade mass, in which the heaviest blade is blade '1' and the lightest blade is blade 'n', in this case blade '36'. In other words, a given blade is lighter than all blades with a lower blade number, and heavier than all blades with a higher blade number.

| Circumferential Position | Blade Number | | | |
|---|---|---|---|---|
| | FIG. 6 | FIG. 7 | FIG. 8 | FIG. 9 |
| A | 1 | 1 | 20 | 20 |
| B | 3 | 3 | 22 | 24 |
| C | 36 | 18 | 24 | 28 |
| D | 34 | 20 | 26 | 32 |
| E | 5 | 5 | 28 | 36 |
| F | 7 | 7 | 30 | 34 |
| G | 32 | 22 | 32 | 30 |
| H | 30 | 24 | 34 | 26 |
| I | 9 | 9 | 36 | 22 |
| J | 11 | 11 | 35 | 18 |
| K | 28 | 26 | 33 | 14 |
| L | 26 | 28 | 31 | 10 |
| M | 13 | 13 | 29 | 6 |
| N | 15 | 15 | 27 | 2 |
| O | 24 | 30 | 25 | 4 |
| P | 22 | 32 | 23 | 8 |
| Q | 17 | 17 | 21 | 12 |
| R | 19 | 19 | 19 | 16 |
| S | 2 | 34 | 17 | 19 |
| T | 4 | 36 | 15 | 23 |
| U | 35 | 2 | 13 | 27 |
| V | 33 | 4 | 11 | 31 |
| W | 6 | 21 | 9 | 35 |
| X | 8 | 23 | 7 | 33 |
| Y | 31 | 6 | 5 | 29 |
| Z | 29 | 8 | 3 | 25 |
| AA | 10 | 25 | 1 | 21 |
| AB | 12 | 27 | 2 | 17 |
| AC | 27 | 10 | 4 | 13 |
| AD | 25 | 12 | 6 | 9 |
| AE | 14 | 29 | 8 | 5 |
| AF | 16 | 31 | 10 | 1 |
| AG | 23 | 14 | 12 | 3 |
| AH | 21 | 16 | 14 | 7 |
| AI | 18 | 33 | 16 | 11 |
| AJ | 20 | 35 | 18 | 15 |

Once again, it will be appreciated that a number of blade arrangements other than those shown by way of example in FIGS. 6 to 9 may be in accordance with, and enjoy the advantages associated with, the present disclosure.

Once the blades have been arranged in the desired pattern (for example the pattern of any one of FIGS. 6 to 9), it may be necessary to balance the rotor 100. If required, this may be achieved by adding one or more balancing masses, such as the mass 130 shown by way of example in FIG. 1. However, some arrangements may not require further balancing, in which case the balancing mass 130 may be omitted.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A rotor for a gas turbine engine comprising a rotor hub and a plurality of rotor blades, each rotor blade being attached to the rotor hub at a rotor blade root, wherein:

the plurality of rotor blades are arranged circumferentially around the rotor hub such that each rotor blade has two neighbouring rotor blades;

each rotor blade of the plurality of rotor blades has a respective mass, wherein the plurality of rotor blades define a median rotor blade mass, and wherein each respective mass is either greater than, less than, or equal to the median rotor blade mass;

for a majority of rotor blades in a first set of rotor blades that have a mass greater than the median rotor blade mass, at least one of the neighbouring rotor blades also has a mass greater than the median rotor blade mass; and for a majority of rotor blades in a first set of rotor blades that have a mass less than the median rotor blade mass, at least one of the neighbouring rotor blades also has a mass less than the median rotor blade mass;

each rotor blade has a position in a list of the plurality of rotor blades ordered by ascending rotor blade mass; and a majority of the plurality of rotor blades have a position in the list of the plurality of rotor blades ordered by rotor blade mass that is within three places of the position in the list of at least one of the neighbouring rotor blades of each rotor blade of the majority of the plurality rotor blades.

2. The rotor according to claim 1, wherein for all rotor blades of the plurality of rotor blades that do not define or exhibit the median rotor blade mass:

rotor blades of the first set have at least one neighbouring rotor blade that also has a mass greater than the median rotor blade mass; and rotor blades of the second set have at least one neighbouring rotor blade that also has a mass less than the median rotor blade mass.

3. The rotor according to claim 1, wherein:

the plurality of rotor blades form a third rotor blade set comprising a total number of n rotor blades, the standard deviation of the mass of the rotor blades in the third rotor blade set being given by $\sigma_{mass}$; and for the majority of the plurality of rotor blades, the difference between the mass of the rotor blade and the mass of at least one of its neighbouring rotor blades is less than the standard deviation of the mass of the rotor blades in the third rotor blade set, $\sigma_{mass}$.

4. The rotor according to claim 3, wherein the difference between the mass of any given rotor blade in the third rotor blade set and the mass of at least one of its neighbouring rotor blades is less than the standard deviation of the mass of the rotor blades in the third rotor blade set, $\sigma_{mass}$.

5. The rotor according to claim 1, wherein at least two adjacent rotor blades from the plurality of rotor blades have a mean mass that is closer to the mass of the heaviest rotor blade than to the median rotor blade mass.

6. The rotor according to claim 1, wherein at least two adjacent rotor blades having a mean mass that is closer to the mass of the lightest rotor blade than to the median rotor blade mass.

7. The rotor according to claim 1, comprising:

a subset R of p circumferentially adjacent rotor blades that all have a mass that is greater than the median rotor blade mass, where p is given by:

$$p=\max\{g \in Z | g \leq (n-1)/x\}$$

where:
Z is the set of integers;
n is the total number of rotor blades in the rotor; and
x is an even number less than (n−1)/2.

8. The rotor according to claim 7, wherein x=2 or x=4.

9. The rotor according to claim 7, comprising at least two such subsets R of circumferentially adjacent rotor blades that all have a mass that is greater than the median rotor blade mass, each subset R being circumferentially separated from another subset R by at least one rotor blade having a mass that is less than the median rotor blade mass, wherein: the number of subsets R is equal to x/2.

10. The rotor according to claim 7, wherein within the subset R of circumferentially adjacent rotor blades, the mass of each blade is less than the mass of the neighbouring rotor blade that is circumferentially closer to the rotor blade within the subset R that has the maximum mass.

11. The rotor according to claim 10, wherein the rotor blade within the subset R that has the maximum mass is positioned circumferentially centrally, such that the difference between the number of rotor blades in the subset R that are on the anticlockwise side of the rotor blade with the maximum mass and the number of rotor blades in the subset R that are on the clockwise side of the rotor blade with the maximum mass is either 0 or 1.

12. The rotor according to claim 1, comprising:

a subset S of q circumferentially neighbouring rotor blades that all have a mass that is less than the median rotor blade mass, where q is given by:

$$q=\max\{j \in Z | j \leq (n-1)/y\}$$

where:
Z is the set of integers;
n is the total number of rotor blades in the rotor; and
y is an even number less than (n−1)/2.

13. The rotor according to claim 12, wherein y=2 or y=4.

14. The rotor according to claim 12, comprising at least two such subsets S of circumferentially adjacent rotor blades that all have a mass that is less than the median rotor blade mass, each subset S being circumferentially separated from another subset S by at least one rotor blade having a mass that is greater than the median rotor blade mass, wherein: the number of subsets S is equal to y/2.

15. The rotor according to claim 12, wherein within the subset S of circumferentially adjacent rotor blades, the mass of each rotor blade is greater than the mass of the adjacent rotor blade that is circumferentially closer to the rotor blade within the subset S that has the minimum mass.

16. The rotor according to claim 15, wherein the rotor blade within the subset S that has the minimum mass is positioned circumferentially centrally, such that the difference between the number of rotor blades in the subset S that are on the anticlockwise side of the rotor blade with the minimum mass and the number of rotor blades in the subset S that are on the clockwise side of the rotor blade with the minimum mass is either 0 or 1.

17. The rotor according to claim 1, comprising a total of n rotor blades, wherein:

if the rotor blades are arranged in mass order from 1 to n, with 1 being the heaviest rotor blade and n being the lightest rotor blade, then rotor blade 1 and any one of rotor blades 2, 3 and 4 are neighbouring rotor blades, and wherein, optionally:

rotor blade 2 and any one of rotor blades 3, 4 and 5 are neighbouring rotor blades that are different to and substantially circumferentially opposite to the rotor blade 1 and any one of 2, 3 and 4.

18. A gas turbine engine comprising a rotor according to claim 1.

19. A method of assembling a rotor for a gas turbine engine, the rotor comprising a rotor hub and a plurality of rotor blades, each rotor blade of the plurality of rotor blades has a respective mass, wherein the plurality of rotor blades define a median rotor blade mass, and wherein each respective mass is either greater than, less than, or equal to the median rotor blade mass, the method comprising:

attaching each rotor blade to the rotor hub using a rotor blade root so as to arrange the rotor blades circumferentially around the rotor hub such that each rotor blade has two neighbouring rotor blades;

arranging the rotor blades such that:

for a majority of rotor blades in a first set of rotor blades that have a mass greater than the median rotor blade mass, at least one of the neighbouring rotor blades also has a mass greater than the median rotor blade mass; and for a majority of rotor blades in a first set of rotor blades that have a mass less than the median rotor blade mass, at least one of the neighbouring rotor blades also has a mass less than the median rotor blade mass;

each rotor blade has a position in a list of the plurality of rotor blades ordered by ascending rotor blade mass; and a majority of the plurality of rotor blades have a position in the list of the plurality of rotor blades ordered by rotor blade mass that is within three places of the position in the list of at least one of the neighbouring rotor blades of each rotor blade of the majority of the plurality rotor blades.

\* \* \* \* \*